United States Patent
Meis et al.

(10) Patent No.: US 6,390,690 B1
(45) Date of Patent: May 21, 2002

(54) FIBER OPTIC CONNECTOR FOR COUPLING DEVICES ON INTERSECTING PLANES

(75) Inventors: Michael Alan Meis, Stillwater; Scott Anthony Igl, St. Paul; Nicholas Anthony Lee, Woodbury, all of MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 0 days.

(21) Appl. No.: 09/573,056

(22) Filed: May 17, 2000

(51) Int. Cl.[7] .............................. G02B 6/36; G02B 6/00

(52) U.S. Cl. ........................ 385/88; 385/147; 385/89

(58) Field of Search ..................... 385/39, 50, 88–92, 385/129, 147

(56) References Cited

U.S. PATENT DOCUMENTS

| | | | | |
|---|---|---|---|---|
| 4,863,232 A | 9/1989 | Kwa | ......................... | 350/96.2 |
| 5,123,073 A | 6/1992 | Pimpinella | ................... | 385/59 |
| 5,144,391 A | 9/1992 | Iwata et al. | ................. | 357/23.7 |
| 5,155,784 A | 10/1992 | Knott | .......................... | 385/88 |
| 5,155,785 A | 10/1992 | Holland et al. | ................ | 385/89 |
| 5,204,925 A | 4/1993 | Bonanni et al. | .............. | 385/89 |
| 5,216,732 A | 6/1993 | Knott | .......................... | 385/59 |
| 5,265,184 A | 11/1993 | Lebby et al. | ............... | 385/132 |
| 5,268,981 A | 12/1993 | Shahid | ........................ | 385/71 |
| 5,416,872 A | 5/1995 | Sizer, II et al. | ............... | 385/92 |
| 5,793,919 A | 8/1998 | Payne et al. | ................ | 385/135 |
| 5,796,896 A | 8/1998 | Lee | .............................. | 385/59 |
| 5,809,191 A | 9/1998 | Stevens et al. | ............... | 385/59 |
| 5,920,670 A | 7/1999 | Lee et al. | ...................... | 385/78 |
| 5,930,428 A | 7/1999 | Irwin et al. | .................... | 385/88 |
| 5,960,138 A | 9/1999 | Shimoji et al. | ............... | 385/58 |
| 6,229,942 B1 * | 5/2001 | Engberg et al. | ............... | 385/89 |

FOREIGN PATENT DOCUMENTS

| | | | | |
|---|---|---|---|---|
| EP | 0 516 337 B1 | 2/1992 | ............ | G02B/6/38 |
| EP | 0 485 196 A2 | 5/1992 | ............ | G02B/6/38 |
| EP | 0 511 799 A2 | 11/1992 | ............ | G02B/6/42 |
| JP | 63212908 | 9/1988 | ............ | G02B/6/38 |

OTHER PUBLICATIONS

M. Niburg et al., "A Complete Sub–System of Paralle Optical Interconnects for Telecom Applications", May 1996 Electronic Components and Technology Conference, pp. 259–263.

* cited by examiner

*Primary Examiner*—Georgia Epps
*Assistant Examiner*—Alicia M. Harrington
(74) *Attorney, Agent, or Firm*—Nestor F. Ho

(57) ABSTRACT

A connector assembly for optically coupling a first optical waveguide array mounted to a first substrate to an optical device on an intersecting second substrate. The first waveguide array includes a plurality of parallel optical waveguides having a minimum desired bend radius. The first and the second substrate define a first and a second plane respectively and the longitudinal direction of the first waveguide array defines a first axis. The intersection of the two planes defines an intersection axis that is generally perpendicular to the first axis. The first waveguide array has a substrate portion mounted to the first substrate, a midspan portion, and an end portion. The connector assembly includes a first connector adapted to be detachably connected to the second substrate and aligned along a second axis generally perpendicular to the intersection axis. The first connector has a first retaining mechanism that receives and retains the end portion of the first optical waveguide array, where the end portion is suspended over the first plane at a distance along the second axis that is at least equal to the minimum desired bend radius. The midspan portion of the second optical waveguide array describes a suspended bend curve between the first and the second plane, the suspended bend curve having a bend radius that is equal to or greater than the desired minimum bend radius.

23 Claims, 11 Drawing Sheets

FIBER OPTIC CONNECTOR FOR COUPLING DEVICES ON INTERSECTING PLANES

GOVERNMENT RIGHTS

The present invention was made with Government support under Contract F30602-97-2-0120 awarded by the U.S. Air Force. The Government has certain rights in this invention.

BACKGROUND OF THE INVENTION

The present invention relates to an optical fiber connector system. More particularly, the present invention relates to a connector assembly for optically coupling optical devices mounted on planar substrates oriented at intersecting angles with respect to each other.

The use of optical fibers for high-volume high-speed communication and data transfer is well established. As the volume of transmitted information grows, the desire for optical fiber cables including multiple optical fibers, and of systems using cables containing multiple optical fibers, has increased.

In traditional cabinet designs, such as a telephone exchange, the cabinet comprises a box having a plurality of internal slots, generally parallel to each other. Components are mounted on planar substrates, to form cards known as circuit boards. A recent technological goal has been the incorporation of optical and opto-electronic devices coupled by optical waveguide buses on the boards. In one preferred embodiment, the optical fibers are arranged in multi-fiber parallel arrays, forming parallel communications buses. The resulting optical cards would desirably be designed to slide into the slots or racks within the cabinet and to interconnect with other components and other boards.

The use of the optical circuit boards in the racked arrangement of traditional electronic cabinets presents new connectorization challenges. Within the cabinet structure, it is common for devices to be mounted on boards that define intersecting planes, such as the perpendicular arrangement of a motherboard and a backplane. A "backplane" derives its name from the back (distal) plane in a parallelepipedal cabinet and generally is orthogonal to the printed circuit (PC) board cards. The term backplane in the present invention refers to an interconnection plane where a multiplicity of interconnections may be made, such as with a common bus or other external devices. For explanation purposes, a backplane is described as having a front or interior face and a back or exterior face.

The need exists to provide a means to allow optical signals to "turn the corner," that is, to couple optically components on intersecting boards. However, optical waveguide signal transmission relies on total internal reflection of a light signal within the waveguide and optical waveguides bent at sharp angles suffer unacceptable microbend and/or macrobend optical signal losses. Furthermore, many optical waveguides, such as glass optical fibers, are fragile and may fracture or crack when bent past a certain physical tolerance. Different optical waveguides have different optical transmission and physical integrity qualities. The acceptable signal losses and the physical flexibility of a waveguide determine the acceptable radius of curvature for a particular fiber. The radius of this curve is defined as the critical bend radius for the particular fiber. It is therefore desirable that an inter-card connector system account for the critical bend radius of the optical waveguide connections.

In addition, in cabinet connection applications, users slide the cards in and out of the cabinet racks. It would be desirable to have a disconnectable fiber connection along the insertion axis of each card. Such a connection would preferably be capable of absorbing excessive insertion pressure, such as that caused by a user "jamming in" a card, while still maintaining the desired bend radius and exerting sufficient connection pressure along the ends of the fibers to ensure a reliable optical connection.

Finally, it would be desirable for a multi-fiber inter-plane connector to maintain the parallel alignment of the fibers in the optical bus, for ease of connectorization, without subjecting the fibers to uneven twisting or tensile stresses.

For the purposes of the present description, the axis of interconnection along one of the planes is called the longitudinal or y-axis and is defined by the longitudinal alignment of the optical fibers at the point of connection. Generally, in backplane applications, the longitudinal axis is collinear with the insertion axis of the cards and the axis of connection of the optical fibers in and out of the cabinets. The lateral or x-axis is defined by the axis of connection of the optical fibers on the other substrate plane. Generally, the x and y-axes are mutually perpendicular. Finally, the intersection of the two planes defines a transverse or z-axis, also called the intersection axis. Again, in most applications, the z-axis is orthogonal to the x-axis and y-axis.

Different connection methods have been suggested to couple optical circuit cards. Some references, such as U.S. Pat. Nos. 4,498,717 or 5,639,263, suggest the use of electrical connections between the intersecting substrates. However, the use of electrical connections necessitates the conversion of optical signals to electrical signals and vice versa at each connection. Optical fiber "jumper" cables have been suggested, but such individual optical fibers are susceptible to damage and to the risk of bending past the critical bend radius of the fiber.

To support the fibers, some references, such as U.S. Pat. Nos. 5,155,785 and 5,204,925, discuss placing the fibers in groves or channels or laminating the fibers to a flexible substrate. In these patents, the optical backplane is a custom backplane designed to contain the optical fibers within it. The bend radius of the fiber is controlled by the thickness of the backplane. As described in the '785 reference, "[t]he optical backplane member 32 has a sufficient thickness between opposite surfaces 33 and 34 to provide an appropriately large radius of curvature through which each optical fiber must be bent in making the connection between the surface 34 and the MAC connector 25. Typical dimensions of the backplane 32 are eight inches by sixteen inches by three inches in thickness. It can be shown that, for digital transmission at practical power levels, the minimum radius of curvature through which an optical fiber may be bent without incurring significant losses is one inch".

An obvious constraint of such design is the required use of specially grooved very thick substrates. The backplane design is described as containing "a complex arrangement of arcuate grooves of varying depth . . . " and as such would appear to be very difficult to design and manufacture for each application.

U.S. Pat. No. 5,793,919, references a backplane interconnect system that connects optical signals from a number of daughter cards on to an optical fiber backplane bus. As such, the backplane fibers are not coupled end to end with the daughter card fibers in a point to point connection system, and the backplane fibers are not terminated in a backplane connector at each daughter card location. The optical signals from each daughter card are added to the continuous fibers of the backplane bus, and the bus fibers carry all signals simultaneously to all coupling locations. This design requires a special "D" fiber profile to enable this longitudinal coupling to take place.

U.S. Pat. No. 5,204,925 relates to an interconnection system containing termination tabs that connect through openings in the electrical backplane, but do not connect to the backplane. This might be considered as an example of a custom optical jumper cable and connector system, not a backplane and connector system. The jumper cable assembly does not provide strain relief or bend radius control for the optical fibers. In use, the fibers are twisted from the plane of the optical jumper circuit in order to connect to the circuit boards. In twisting the termination tabs containing the optical fibers, a torsional force is applied to the fibers in the tab, which will impart a long-term stress on the individual fibers, or may cause the fibers to shift within the assembly in order to relieve stress.

The need remains for an effective connector for optically coupling parallel multifiber optical devices in intersecting optical boards.

SUMMARY OF THE INVENTION

A connector assembly for coupling optical devices disposed on a first and a second plane, wherein the first and second planes intersect at an intersection axis z. The connector assembly comprises an optical waveguide array, a first waveguide retaining means, and a second waveguide retaining means. The first plane is defined by a first substrate, such as a circuit card, and the second plane is defined by a second substrate. In one embodiment, the first substrate comprises a motherboard and the second substrate comprises a daughter card generally perpendicular to the motherboard. In another embodiment, the first substrate comprises a backplane and the second substrate comprises a printed circuit card generally perpendicular to the backplane.

The optical waveguide array includes a plurality of waveguides, such as optical fibers arranged in a parallel array. In one exemplary embodiment, the first and second waveguide arrays are optical buses optically coupled to optical devices. The waveguides have a minimum desired bend radius, which is at least as large as the critical bend radius for the waveguides.

The first waveguide retaining means secures a first end portion of the optical waveguide array to the first plane. The second waveguide retaining means secures a second end portion of the optical waveguide array to the second plane. The first and second waveguide retaining means secure the first and second end portions of the waveguide array at minimum predetermined first and second distances from the intersection axis z. The waveguide array arches between the first and the second plane having a bend radius equal to or greater than the minimum desired bend radius.

In one exemplary embodiment, the connector assembly optically couples a first optical waveguide array attached/mounted to a first substrate to an optical device on an intersecting second substrate. The first waveguide array includes a plurality of parallel optical waveguides having a minimum desired bend radius. The first and the second substrate define a first and a second plane respectively and the longitudinal direction of the first waveguide array defines a first axis. The intersection of the two planes defines an intersection axis that is generally perpendicular to the first axis. The first waveguide array has a substrate portion mounted to the first substrate (such as by adhesive or another connector), a midspan portion, and an end portion. The connector assembly includes a first connector mounted to the first substrate and aligned along a second axis generally perpendicular to the intersection axis. The first connector has a first retaining mechanism that receives and retains the end portion of the first optical waveguide array, where the end portion is suspended over the first plane at a distance along the second axis that is at least equal to the minimum desired bend radius. The midspan portion of the second optical waveguide array describes a suspended bend curve between the first and the second plane, the suspended bend curve having a bend radius that is equal to or greater than the desired minimum bend radius.

In this exemplary embodiment, the waveguide array comprises a plurality of parallel optical fibers and the first retaining mechanism comprises a v-grooved fiber receiving surface that accommodates the parallel optical fibers of the first optical waveguide array. A cover snaps over the receiving surface and secures the parallel optical fibers against the fiber-receiving surface. The cover includes a chamfered portion at the end closer to the intersection axis, the chamfered portion describing a curve having a radius at least equal to the minimum desired bend radius of the first optical waveguide array.

The connector assembly further comprises a second connector having alignment and mating features matching and coupling to the first connector. The second connector is aligned along the second axis and the second plane, the second connector including a second retaining mechanism that receives and retains a second optical waveguide array.

In the present exemplary embodiment, the first and second connectors have limited first and second ranges of movement along the second axis. The first retaining mechanism is slidably mounted parallel to the second substrate and allows the end portion a first range of movement along the second axis, the first range of movement determining a maximum and a minimum position with respect to the first plane. The first connector includes a first connector block and a mounting assembly, the first connector block being slidably mounted onto the mounting assembly. The mounting assembly includes at least one detent member that limits the range of motion of the first connector block. The minimum and maximum positions are selected such that the radius of the suspended bend curve of the midspan portion at either position is at least equal to the minimum desired bend radius for the first optical waveguide array. The first and the second connector include biasing elements, such as springs, that bias the first and second connectors towards each other and into a desired connected position. A cover element slides over the first and the second connector. The cover element has internal geometry features that match external geometry features of the first and second connectors and that align the first and second connectors.

In a second exemplary embodiment, the connector assembly may further comprise a third connector that retains the substrate portion of the first optical waveguide array. The third connector is slidably coupled to the first substrate, such as by tabs secured in a longitudinal slot. The slidable coupling allows a third range of motion for the substrate portion of the waveguide array along the first axis. The third range of motion has a maximum and a minimum value such that the bend radius of the suspended portion is at all times at least equal to the minimum desired bend radius.

Other exemplary embodiments may include a plurality of connector pairs contained in a single shell. The connector pairs may be staggered or planarly aligned.

In other exemplary embodiments, the second connector comprises a receptacle having an optical device, wherein the receptacle optically connects to the first connector. The third connector also may connect to a receptacle having an optical device.

In yet other examplary embodiments, the optical waveguide array may be a flexible array of polymer waveguides, such as those disclosed in U.S. Pat. No. 5,265, 184.

DETAILED DESCRIPTION OF THE INVENTION

Figure 1:
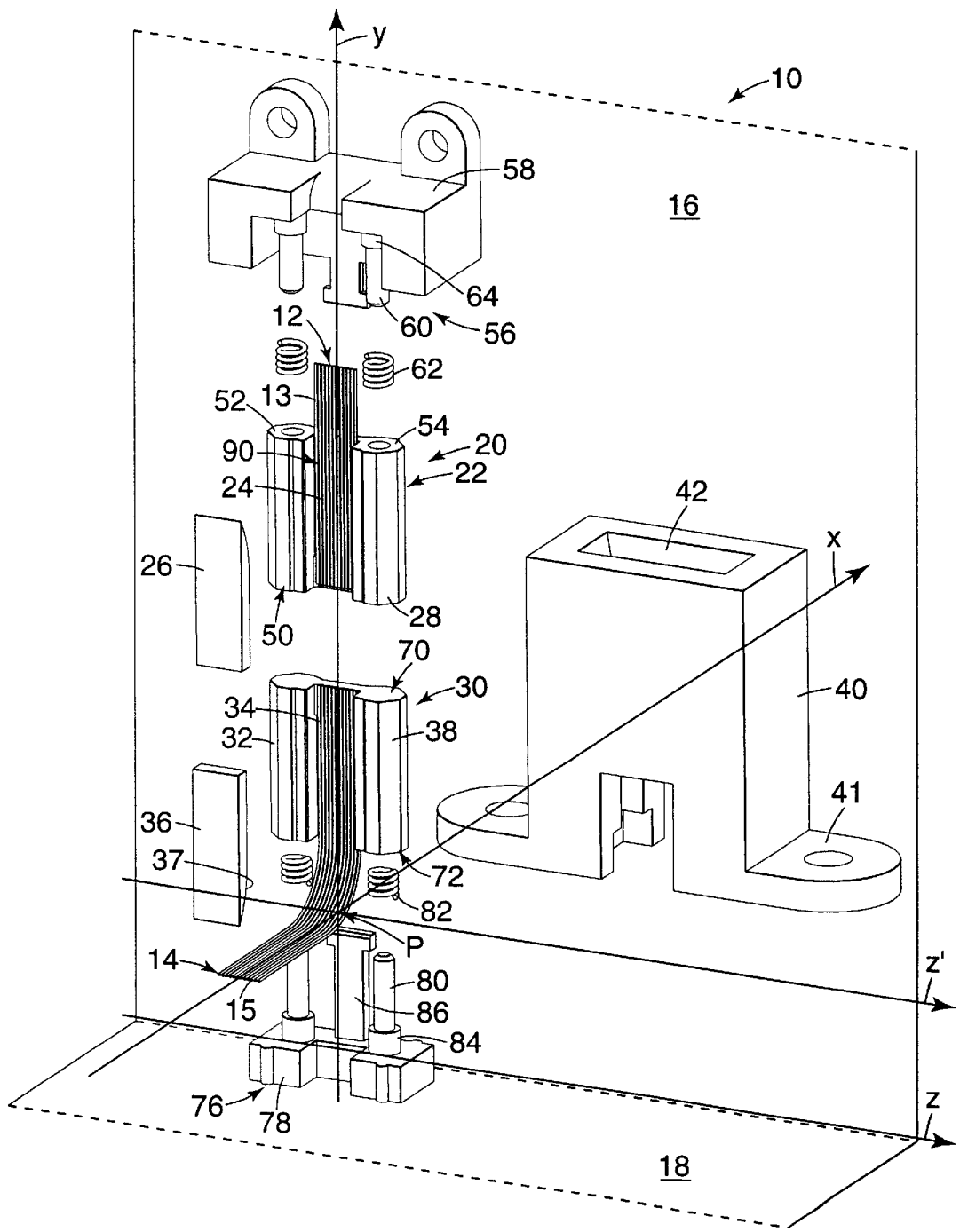
FIG. 1 is a perspective exploded view of a connector assembly in accordance with the present invention.
Figure 2:
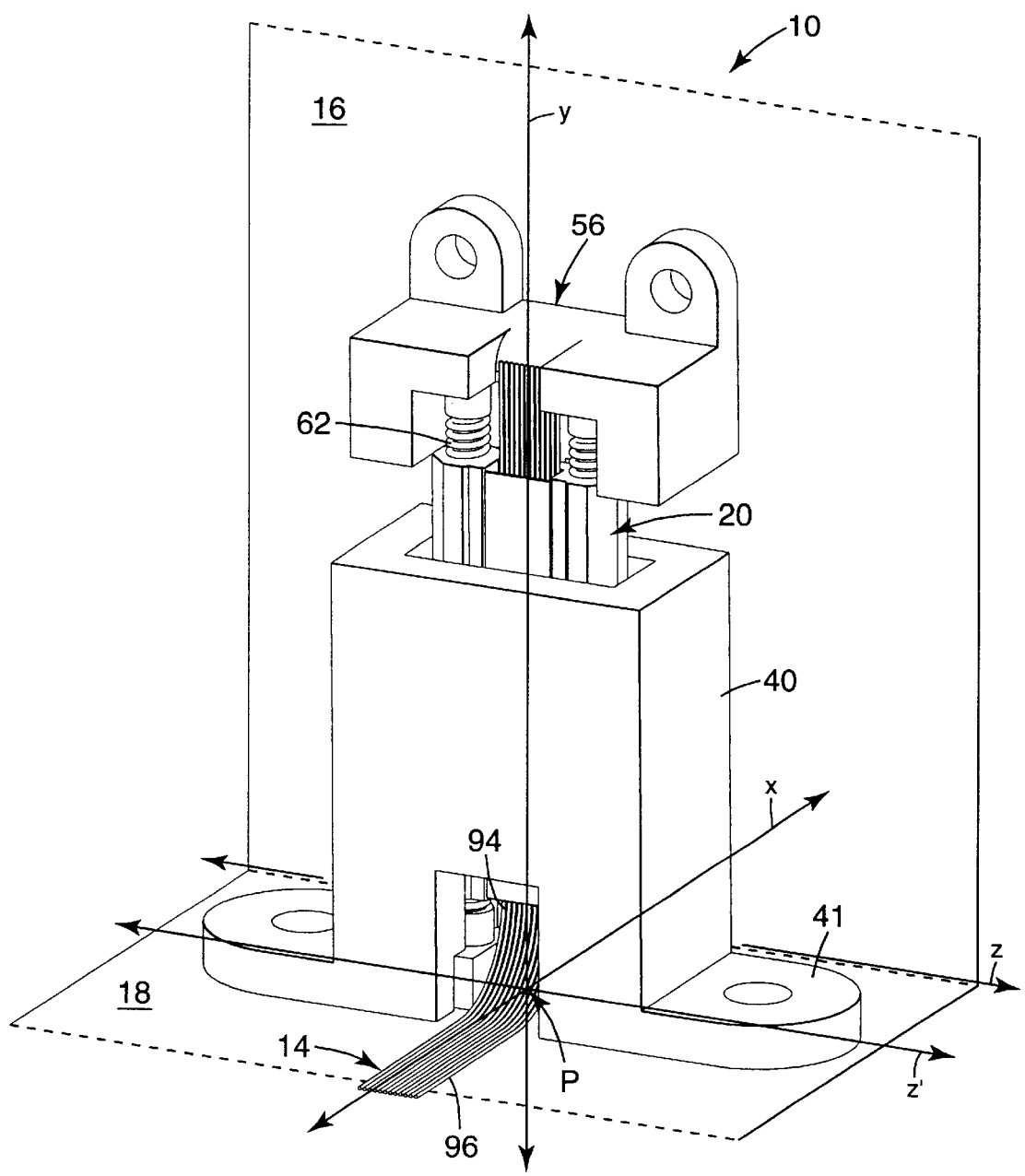
FIG. 2 is a perspective view of the assembled connector assembly of FIG. 1.
Figure 3:
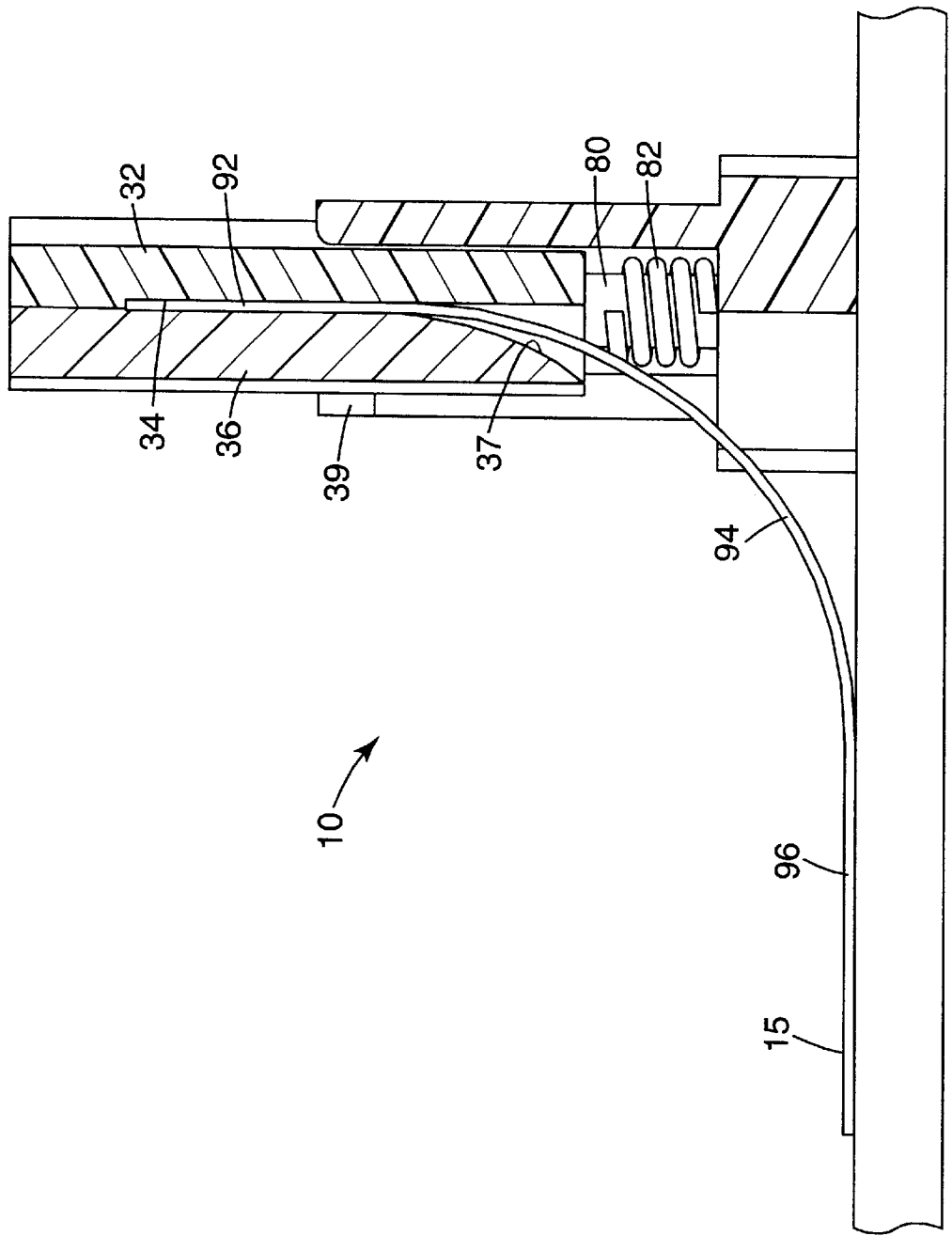
FIG. 3 is a partial cross-sectional side elevation view of the connector assembly of FIG. 1.

FIGS. 1–3 illustrate a connector assembly 10 in accordance with the present invention. The connector assembly 10 is designed to provide termination and interconnection means between a first optical waveguide array 12 and a matching second parallel optical waveguide array 14. In the present embodiment, the first and second waveguide arrays are parallel optical buses optically coupling to optical devices. The term optical devices is meant to include optical waveguides, light and signal sources—such as light-emitting diodes, laser sources (e.g., vertical cavity-surface emitting lasers "VCSEL")—optical receptors, and opto-electronic devices.

The first bus 12 includes an array of multiple optical waveguides 13 positioned in or parallel to the plane of a first planer substrate 16. The second waveguide bus 14 includes a corresponding number of optical waveguides 15 positioned in or parallel to a second substrate 18. The first substrate 16 may be inserted along slots to abut with the second substrate 18.

In the present exemplary embodiment, the first substrate 16 may be seen as a printed circuit (PC) board that plugs into a backplane 18. Alternatively, the connector assembly of the present invention similarly may be used for a slidable daughter card riding on and substantially perpendicular to a motherboard, which in turn may be arranged perpendicularly to a backplane.

The initial longitudinal alignment of the first bus 12 defines a first connection y-axis and the initial longitudinal alignment of the second bus 14 defines a second connection x-axis. We further define an axis z', which is parallel to z and passes through point P. The first substrate 16 and the second substrate 18 are planar substrates, defining mutually intersecting first and second planes respectively. Although in this exemplary embodiment the first substrate 16 and the second substrate 18 are mutually perpendicular, the substrates may align at intersecting angles other than ninety degrees in alternative embodiments. The intersection of the x-axis and the y-axis define an intersection point P. The intersection of the first plane with the second plane defines an axis of intersection z, that is generally perpendicular to the first and the second connection axis. In the present exemplary embodiment, axes x and y also are mutually perpendicular.

The connector assembly 10 includes a first connector 20 and a second connector 30. The term connector refers to connector elements, including ferrules and receptacles. The first connector 20 is aligned along the first connection axis y and the first plane. The first connector 20 includes a first connector block or ferrule 22 that includes a waveguide retaining area 24 including a plurality of v-grooves for receiving each one of the individual waveguides 13 of the first parallel optical waveguide array or bus 12. In the present embodiment, the first parallel optical waveguide bus 12 includes a plurality of multimode glass optical fibers, such as GGP fiber 3M Telecom Systems Division, Austin, Tex. A cover 26 is inserted and is retained over the fiber retaining area 24 to secure the waveguide bus 12 within the first connector 20. While the illustrated embodiment uses multimode glass optical fibers, it should be understood that the term waveguides encompasses a variety of other optical waveguides, such as single-mode fibers, plastic optical fibers, and polymer waveguides.

The second connector 30 also is aligned with respect to the y-axis, parallel to the first substrate 16. The second connector 30 includes a second connector block or ferrule 32 having a fiber receiving surface 34, and a second cover 36. In the present exemplary embodiment, the second cover 36 includes a lower chamfered radius portion that allows a portion of the individual fibers 15 of the second optical bus 14 to have limited freedom of motion along the x axis. The radiused chamfer in cover 36 helps control fiber radius and eliminates kinking of the optical fibers 15. Other alternative embodiments may include rectangular covers that do not have the chamfered portion 37.

The connector block 22 of the first connector 20 and the connector block 32 of the second connector 30 both include external alignment features 28 and 38, respectively, in the form of polyhedral side structures. An outer cover or shell 40 slides over connectors 20 and 30. The outside shell 40 is a rigid structure including a hollow inner chamber 42. The shell 40 may include tabs 41 for mounting onto substrate 18. The inner walls of chamber 42 match and compliment the profile of the external alignment features 28 and 38. Alternative embodiments include other alignment features, such as those described in commonly owned U.S. Pat. No. 5,920,670 and co-pending and commonly owned U.S. patent applications Ser. Nos. 09/201,798, filed Nov. 30, 1998, and Ser. No. 09/312,561, filed May 14, 1999, which are hereby incorporated by reference.

The first connector 20 further includes a front, mating face 50 and a back face 52. The connector block 22 includes holes 54 on the back face 52 that allow the connector 20 to be placed on a pin assembly 56. The pin assembly 56 includes a mounting bracket 58 that couples the pin assembly 56 and the first connector 20 to the first substrate 16. The pin assembly 56 further includes pins 60 aligned parallel to the y-axis with the receiving cavities 54. Springs 62 are placed onto each pin 60. The springs 62 provide compressive force on the mating face 50 of the connector block 22 during mating.

The connector block 22 has a limited freedom of movement along the y-axis along the pins 60. The longitudinal travel along the pins 60 provides length tolerance between the two connectors 20 and 30. The pins 60 include detent features 64 in the form of areas having a larger diameter than that of the receiving cavities 54 that limit the "upward" or "backward" range of movement of the block 22. Internal catch features and/or the opposing connector block 32 limit the "downward" or "forward" range of movement. The springs 62 forward bias the connector block 22.

Similarly, the second connector 30 includes a front mating face 70 and a back face 72 defining receiving apertures 74 (not seen). The second connector block 32 slides onto a second pin assembly 76 and has a limited freedom of movement along the y-axis. The second pin assembly 76 includes a mounting bracket 78 that couples the second pin assembly 76 and the second connector 30 to the second substrate 18. The second pin assembly 76 includes pins 80 aligned to be inserted into the receiving cavities 74 and to allow axial movement along the y-axis of the second connector 30. Springs 82 are placed over the pins 80 and provide a forward bias on the mating face 70. Detent features 84 limit the "downward" axial movement of the second connector 30 along the y-axis, while the opposing mating face 50 and/or internal catch features limit the "upward" axial movement. Both the detent features 84 and the springs 82 of the second pin assembly 76 are sized such that the back face 72 of the second connector 30 remains at a predetermined distance from the surface of the second substrate 18. The springs 62 and 82 assure a tight and flush contact between the opposite mating faces 50 and 70.

The spring-loaded nature of the bottom connector 30 has three important advantages. First, the size of the springs and the detents help control the bend radius of the fiber bus 14. To do this, the minimum radius of the fibers 15 is controlled when the compressed length of the springs 82 is reached. Connector latch 86 stops the vertical ferrule movement and limits the maximum (extended) fiber condition. A radius in the ferrule cover 36 also acts to control the fiber 15 in the extended condition and eliminates kinking of the fiber. Second, the spring-loaded nature of the connector 30 gives compliance and protection to the connector 30 and fiber ends when the top connector 20 is inserted. For example, as the user pushes the top connector 20 into the shell 40 to mate with the bottom connector 30, the springs 82 and 62 take up the dynamic movement. Third, the spring force on ferrule 32 in the bottom connector 30 holds the faces of the ferrules 22 and 32 and fiber ends in intimate contact, thus maintaining low optical loss in the connection. The top connector 20 also may be spring loaded (as shown here) to add additional compliance to the system.

The connector alignment blocks 22 and 32 in the present embodiment are made of thermoplastic (Fortron™ from Ticona) formed by injection molding. In the alternative embodiments, the connector blocks may be formed of other material such as ceramic, metal, thermoset polymer, formed by techniques such as grinding, machining or thermoset molding. The outer shell 40 is formed of thermoplastic (Ultem™ from GE Thermoplastics). The pin assembly and pins are formed of thermoplastic (Ultem™). Alternative embodiments may include thermoset polymers or metal.

Referring to FIG. 1, the first optical bus 12 includes an end portion 90. The end portion 90 is the portion retained between the cover 26 and the fiber retaining surface 24. The individual optical fibers 13 of the portion 90 of the first optical bus 12 are maintained in precise parallel alignment and distribution within the v-grooves of the fiber retaining surface 24. The ends of the optical fibers 13 along the front mating surface 50 are cleaved and polished for connection.

Figure 4:
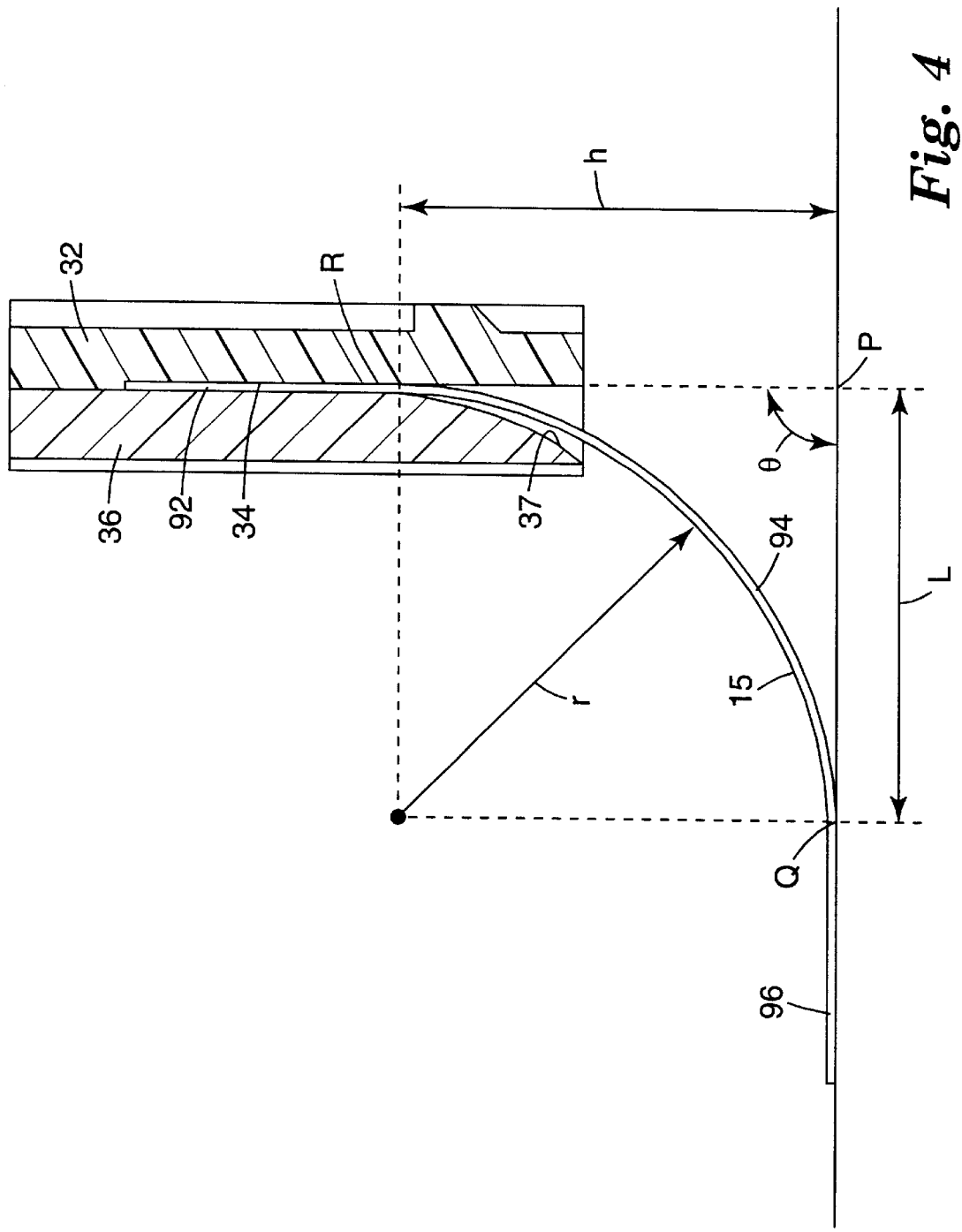
FIG. 4 is a simplified detail side elevation view of a portion the connector assembly of FIG. 1.

Referring to FIGS. 2, 3 and 4, the second optical bus 14 includes an end portion 92, a free portion 94, and a substrate portion 96. The end portion 92 is retained between the cover 36 and the fiber receiving surface 34 of the second connector 30. As mentioned above, the cover 36 includes a chamfered bottom portion 37. The free portion 94 of the second optical bus 14 is allowed to arch freely between the second connector 30 and the second substrate 18. The substrate portion 96 of the second optical bus 14 is retained, such as by an adhesive or other retaining means known in the art, to the second substrate 18.

The freedom of movement along the y-axis of the connectors 20 and 30 is controlled to account for the critical bend radius for the optical fibers 15. FIG. 4 illustrates in simplified detail the bend geometry of an optical fiber in the connector assembly of FIG. 1. The first point at which the fibers 15 are physically retained between cover 36 and the fiber alignment block 32 is defined as point R. The distance along the y-axis between point R and the intersection point P at the surface of the second substrate 18 is defined as height h. The point at which the fiber 15 is retained on the second substrate 18 is defined as point Q. The distance along the x-axis between points P and Q is labeled L. The radius of curvature of the optical fiber 15 is labeled as r.

The minimum and maximum values for distances h and L are selected such that the radius of curvature r is not less than the critical bend radius, $r_{crit}$, for the optical fiber 15. FIG. 5 illustrates the range of motion of the connector, using the three main conditions for an optical fiber in a connector in accordance with the present invention. Dimensionless units are used, and the minimum desired bend radius is arbitrarily defined as $r_{min}=0.25>r_{crit}$.

Figure 5A:
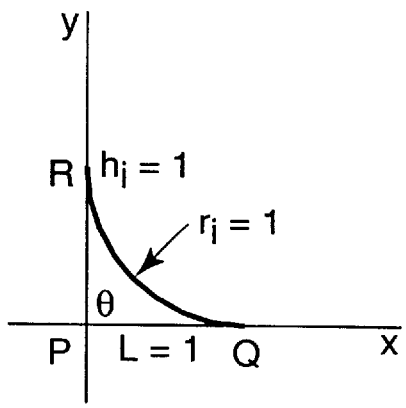
FIG. 5a is a graphical representation of the bend geometry of optical fibers of a connector assembly in accordance with the present invention under an initial condition.

FIG. 5a illustrates an initial or connected condition, such as where the position of connector 30 is determined by engaging contact with the mating connector 20. For illustrative purposes, FIG. 5 uses dimensionless units, where $h_i=1$ unit, $L=1$ unit and $r_i=1$ unit. It may be appreciated that the curve is a $\pi/2$ curve, where $h=L=r$. Since the attachment point Q is fixed, L is a constant. The initial condition is selected to be in between the maximum and minimum values for h and r.

Figure 5B:
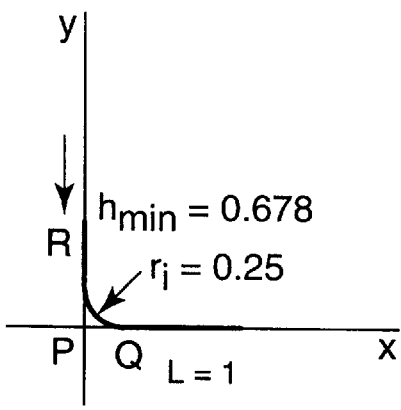
FIG. 5b is a graphical representation of the bend geometry of optical fibers of a connector assembly in accordance with the present invention under a compressed condition.

FIG. 5b illustrates a compressed condition, such as that which may occur when the second connector 30 is pressed down during insertion of the card 16. The minimum value of h allowed, $h_{min}$, —controlled by a hard mechanical stop, such as the detents 84—is 0.678 units to allow a minimum value of r, $r_{min}$, of 0.25 units. The relationship between height and angle for any given radius r is:

$$h=r(1+\cos(\theta)),$$

where $\theta$ is the intersection angle between the two intersecting planes. Knowing the desired minimum value for r, those skilled in the art may readily calculate the minimum height h.

Figure 5C:
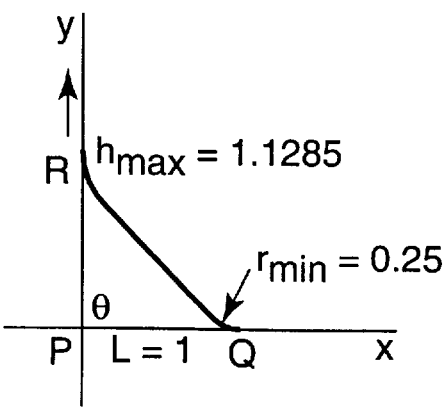
FIG. 5c is a graphical representation of the bend geometry of optical fibers of a connector assembly in accordance with the present invention under an extended condition.

FIG. 5c illustrates an extended condition, where the connector 30 is extended to its maximum range of y-axis travel, such as when the card 16 is being pulled out for disconnection. In the present embodiment, the upward travel of the connector 30 is constrained by a hard mechanical stop in the form of a latch 286. Under such conditions, the points of concern in relation to minimum bend angles are located proximate to points R and point Q.

Figure 6A:
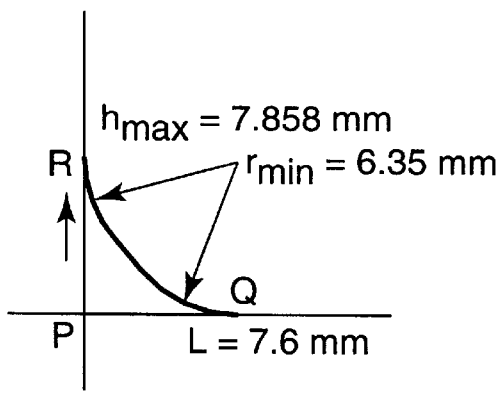
FIG. 6a is a graphical representation of the unconnected condition of optical fibers of the connector assembly of FIG. 1.
Figure 6B:
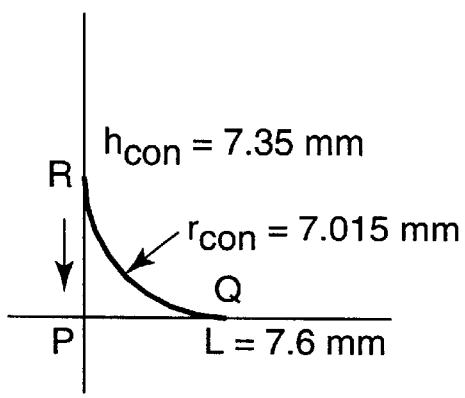
FIG. 6b is a graphical representation of the connected condition of optical fibers of the connector assembly of FIG. 1.
Figure 6C:
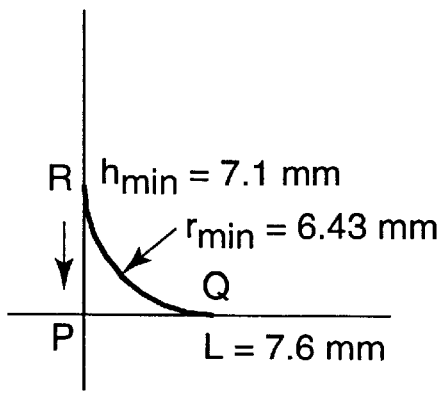
FIG. 6c is a graphical representation of the compressed condition of optical fibers of the connector assembly of FIG. 1.

FIGS. 6a–6c illustrate actual values used for the embodiment illustrated in FIGS. 1–3. FIG. 6a illustrates the first possible extreme, called the extended condition, in which the second connector 30 has traveled to its utmost position along the y-axis. Under such conditions, the points of concern in relation to minimum bend angles are located proximate to point R and point Q. The maximum value of h may be controlled by adjusting the location of the detent stops 64 of the first pin assembly 56. The latch 286 usually will be set at a point R where $h<h_{max}$, so as to prevent the occurrence of the extended condition.

FIG. 6b illustrates the connected condition, in which the height h is established by the contact of the first connector 20 and the second connector 30.

FIG. 6c illustrates the condition in which the second connector 30 is pressed, such as by an excessive user pressure during connection to the minimum distance allowed by the hard stop detent features 84. This minimum distance is calculated as described above, to guarantee that the minimum bend radius remains greater than the critical bend radius.

The values illustrated in FIG. 6 are for 3M GGP fiber. The minimum bend radius described above is typically specified for fiber bending stress issues, not for optical loss issues. The 3M high strength fiber does not require a traditional one-inch minimum bend radius, instead requiring only a 0.25 inch (0.635 centimeters) bend radius.

Figure 7:
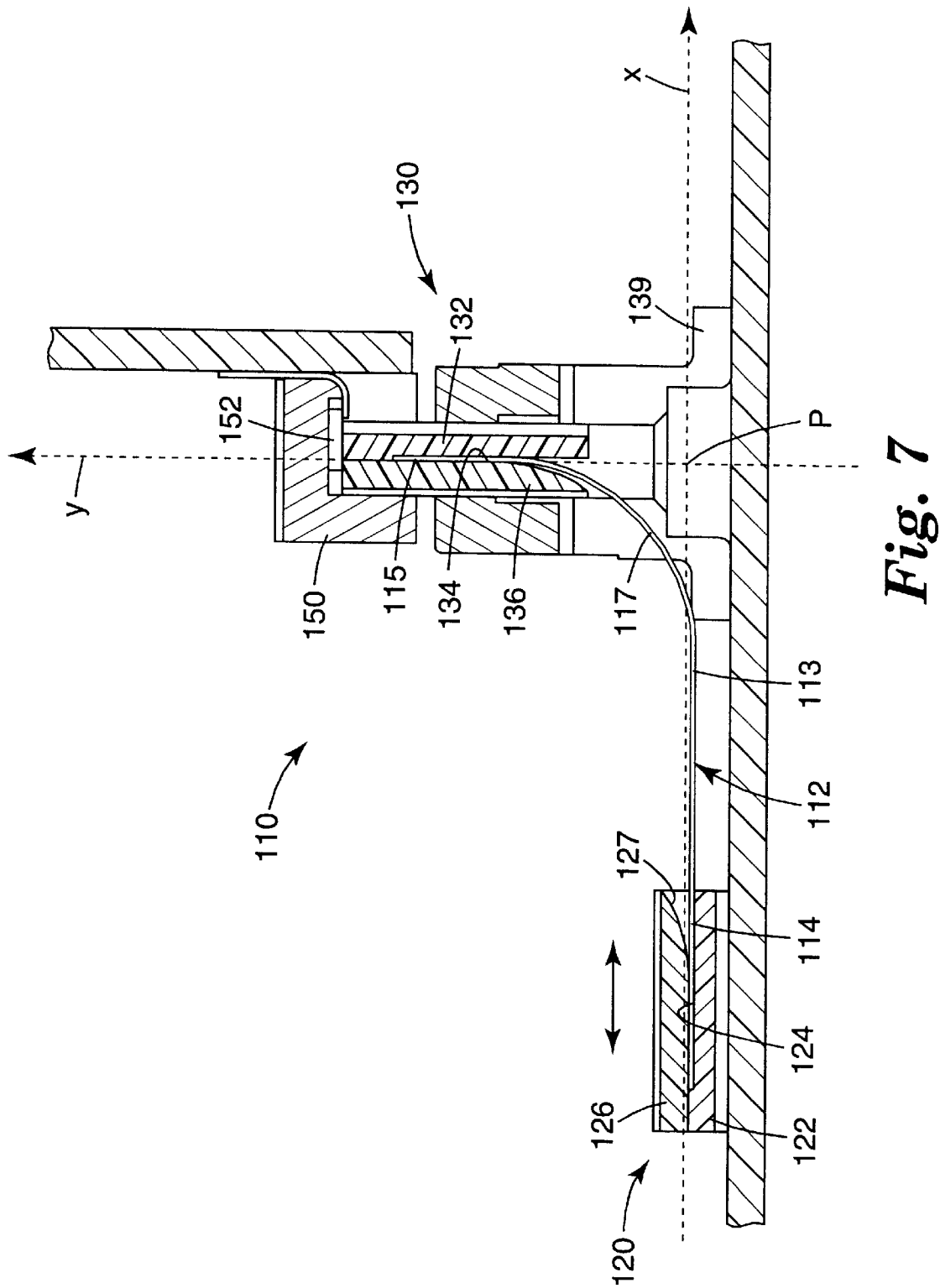
FIG. 7 is a cross-sectional side elevation view of a second embodiment of a connector assembly in accordance with the present invention having freedom of movement along both connector axes.

FIG. 7 illustrates a second embodiment of a connector system 110 in accordance with the present invention coupling optical devices on a daughter board 116 to a motherboard 118. The connector system 110 includes a first connector 120 and a second connector 130, and a connecting optical bus 112. The connecting optical bus 112 includes a plurality of optical fibers 113 arranged in parallel. A first end portion 114 of the optical bus 112 is retained by the first connector 120 and a second end portion 115 of the optical bus 112 is retained by the second connector 130. A free portion 117 of the optical bus 112 arches between the two connectors 120 and 130.

The second connector 130 is similar to connector 30 of the embodiment of FIGS. 1–3. The second connector 130 includes a connector block 132, a front loading fiber-receiving surface 134, and a cover or fiber-retaining plate 136. Mounting legs 139 secure the connector 130 to and space the connector block 132 from a motherboard 118. The second connector 130 is aligned along the longitudinal y-axis and has a limited longitudinal range of movement. A pin and spring system, such as those described for the connector 30, or other physical means such as detentes may be used to allow and control the longitudinal freedom of movement of the connector 130.

The second connector 130 mates with a receptacle (i.e., a connector element) 150 including a transmitting and/or receiving opto-electronic element 152, such as a light emitting diode array, diode laser array, or a photoreceptor array. The receptacle 150 is mechanically attached to the daughter board 116. In alternative embodiments, the second connector 130 may be coupled to an opposing connector, such as connector 20 of the system 10.

The first connector 120 has a limited range of movement along the lateral x-axis. The first connector 120 includes a sliding alignment or connector block 122, a fiber-receiving surface 124, and a cover 126. The connector block 122 includes lateral rails (not shown) that mate with corresponding lateral grooves (not shown) on the motherboard 118. The length of the grooves determines the range of movement of the connector block 122. Spring means may be placed in the grooves to bias the alignment block in the negative x direction. Both cover elements 126 and 136 include chamfered end portions 127 and 137 respectively. The radius of curvature of portions 127 and 137 is at more than the critical radius of curvature for the fiber, thus alleviating the problems encountered in the extended conditions illustrated in FIGS. 8c and 8d.

Figure 8A:
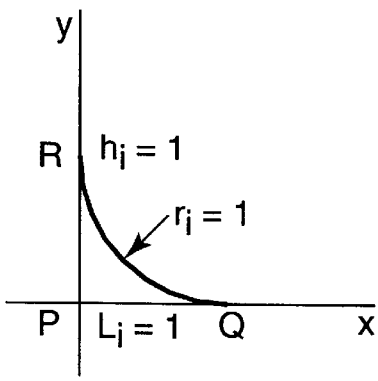
FIG. 8a is a graphical representation of the bend geometry of the optical fibers of the connector assembly of FIG. 7 under an initial condition.
Figure 8B:
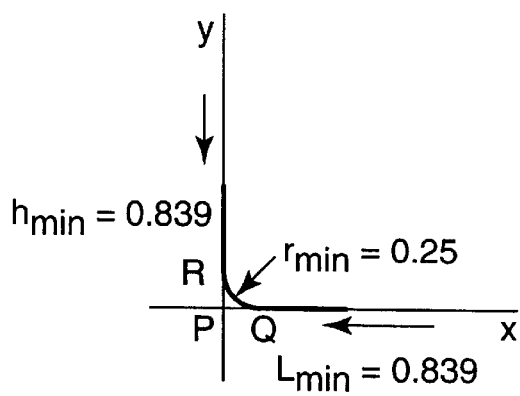
FIG. 8b is a graphical representation of the bend geometry of optical fibers of the connector assembly of FIG. 7 under a compressed condition.
Figure 8C:
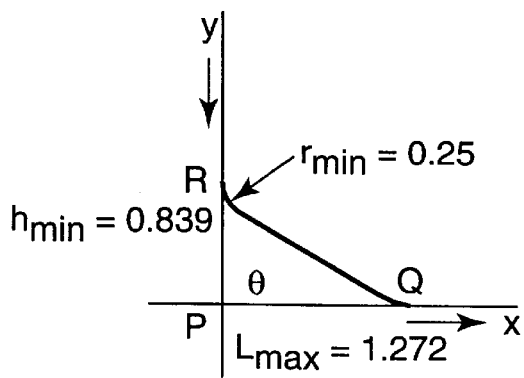
FIG. 8c is a graphical representation of the bend geometry of optical fibers of the connector assembly of FIG. 7 under an extended condition along the x-axis.
Figure 8D:
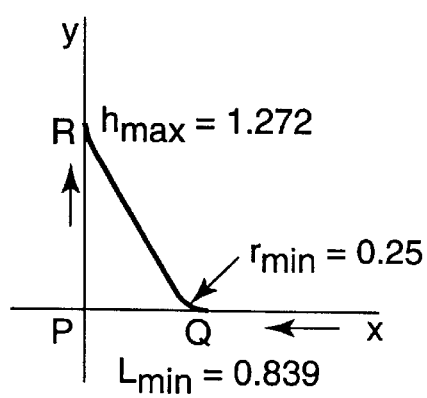
FIG. 8d is a graphical representation of the bend geometry of optical fibers of the connector assembly of FIG. 7 under an extended condition along the y-axis.

FIGS. 8a–8d illustrate different fiber curvature conditions for the system 110 illustrated in FIG. 7. Dimensionless units are used and 0.25 is used as the minimum desired bend radius, $r_{min}$. FIG. 8 uses the same labels for h, L, r, P and $\theta$ identified in FIG. 4. FIG. 8a illustrates an initial/connected position, in which both connectors 120 and 130 are at an equal distance from point P. FIG. 8b illustrates a compressed condition in which both connectors 120 and 130 are pressed in towards point P. FIG. 8c illustrates the condition when the first connector 120 is extended away from point P, while FIG. 8d illustrates when the second connector 130 is extended away from point P.

Again, the minimum height (h) of the backplane interconnect, for a given minimum fiber radius ($r_{min}$), varies with the angle between the two planes ($\theta$). Knowing the value for any desired minimum bend radius, $r_{min}$, the distances h and L may be calculated using the following equation:

$$h=r(1+\cos(\theta)) \hspace{2em} \text{(Equation 1)}$$

Figure 9:
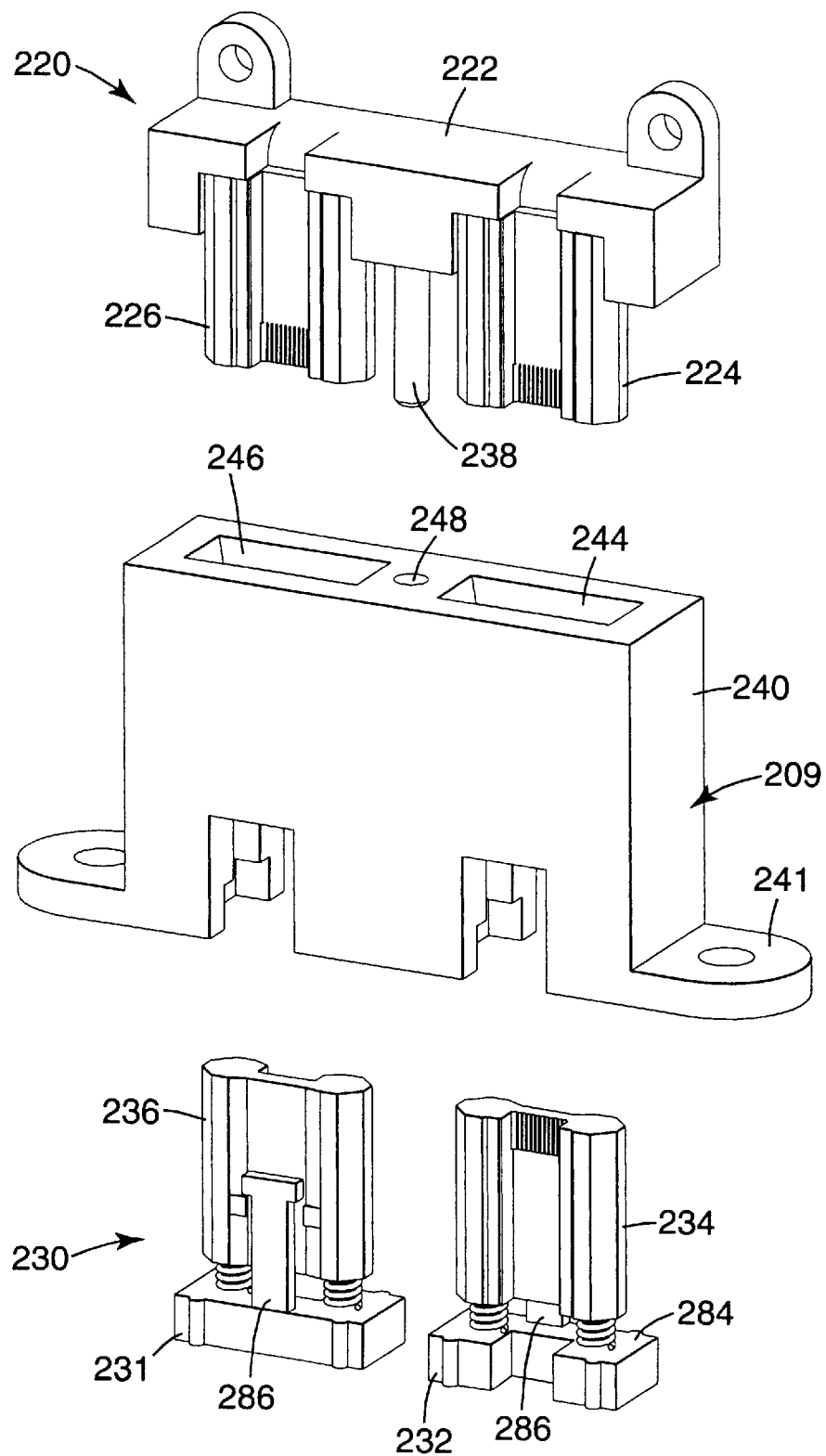
FIG. 9 is a perspective view of a third embodiment of a connector assembly in accordance with the present invention, including a dual bus arrangement.

FIG. 9 illustrates a third embodiment of a connector system 210 in accordance with the present invention. The connector system 210 includes a top connector set 220 and a bottom connector set 230. The top connector set 220 includes a mounting bracket 222 that couples the connector set 220 to a daughter board, and two connector ferrules 224 and 226 aligned side by side. The mounting bracket includes a pre-alignment pin 238. The top connector ferrules 224 and 226 include external alignment surfaces.

The bottom connector set 230 includes two sets of bottom connectors similar to connector 30 of the embodiment illustrated in FIGS. 1–3. Mounting bases 231 and 232 including pins (not seen) attach a first and a second ferrule, 234 and 236 respectively, to a motherboard. Springs 284 and detent features (not seen) provide a physical stop for a downward range of motion of the ferrules 234 and 236. Each mounting base 231 and 232 includes a mechanical catch 286 that slides along the back of each ferrule 234 and 236 and controls the upper range of movement.

A single shell 240 having a first and a second cavity 244 and 246 retains and aligns the top and the bottom connector ferrule pairs. The internal geometry of the cavities 244 and 246 matches the external geometry and alignment surfaces of the top and bottom ferrule pairs 224, 234 and 226, 236 respectively. The first bottom ferrule 234 is aligned opposite the first top ferrule 224, while the second bottom ferrule 236 likewise is aligned opposite the second top ferrule 226. The pre-alignment pin 238 matches a receiving orifice 248 on the shell 240. The pre-alignment pin 238 in the top connector 220 acts to align the top connector 220 to the receiving shell 240 before the ferrules 224 and 226 enter the cavities 244 and 246 of the shell 240. This is done to help align the ferrules 224 and 226 with their corresponding receiving cavities 244 and 246 and ensure smooth entrance.

Figure 10:
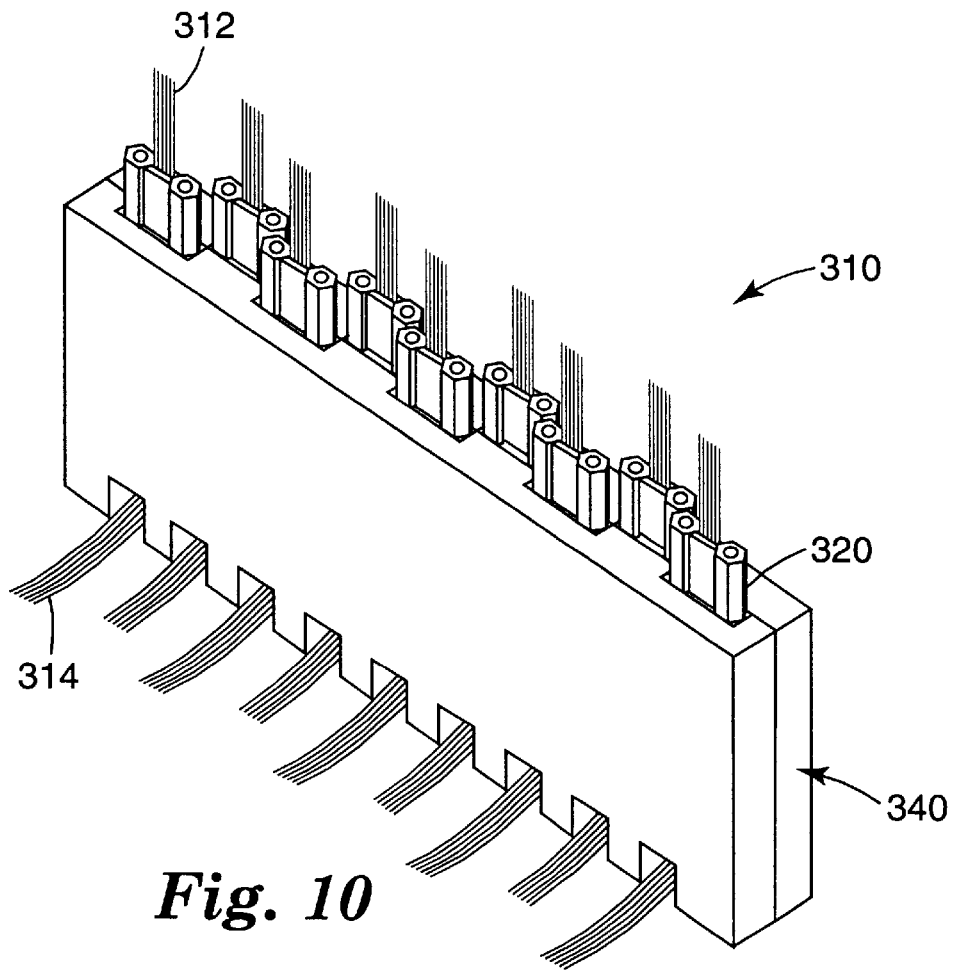
FIG. 10 is a perspective view of a fourth embodiment of a connector assembly in accordance with the present invention including a plurality of staggered connector assemblies in the multi-ferruled shell.
Figure 11:
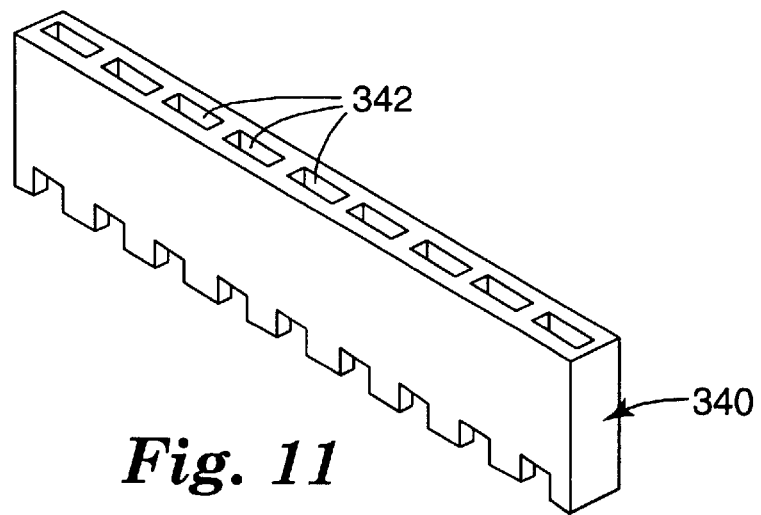
FIG. 11 is a perspective view of a multi-ferrule shell of a fifth embodiment of a connector assembly in accordance with the present invention including a plurality of coplanar connector assemblies.

FIGS. 10 and 11 illustrate other embodiments of high density, multi-ferrule optical connector systems made possible by the modular design of the connector of the present invention. FIG. 10 illustrates a connector system 310 including a plurality of staggered connector ferrule pairs 320 retained in a shell 340. The connector system 310 couples a plurality of bus pairs 312 and 314.

FIG. 11 illustrates an alternative shell 340 in which the receiving apertures 342 are aligned along the same plane. In other embodiments, multiple ferrules may be held in multiple rows, with their positions offset from one row to the next to decrease the overall connector length.

Figure 12:
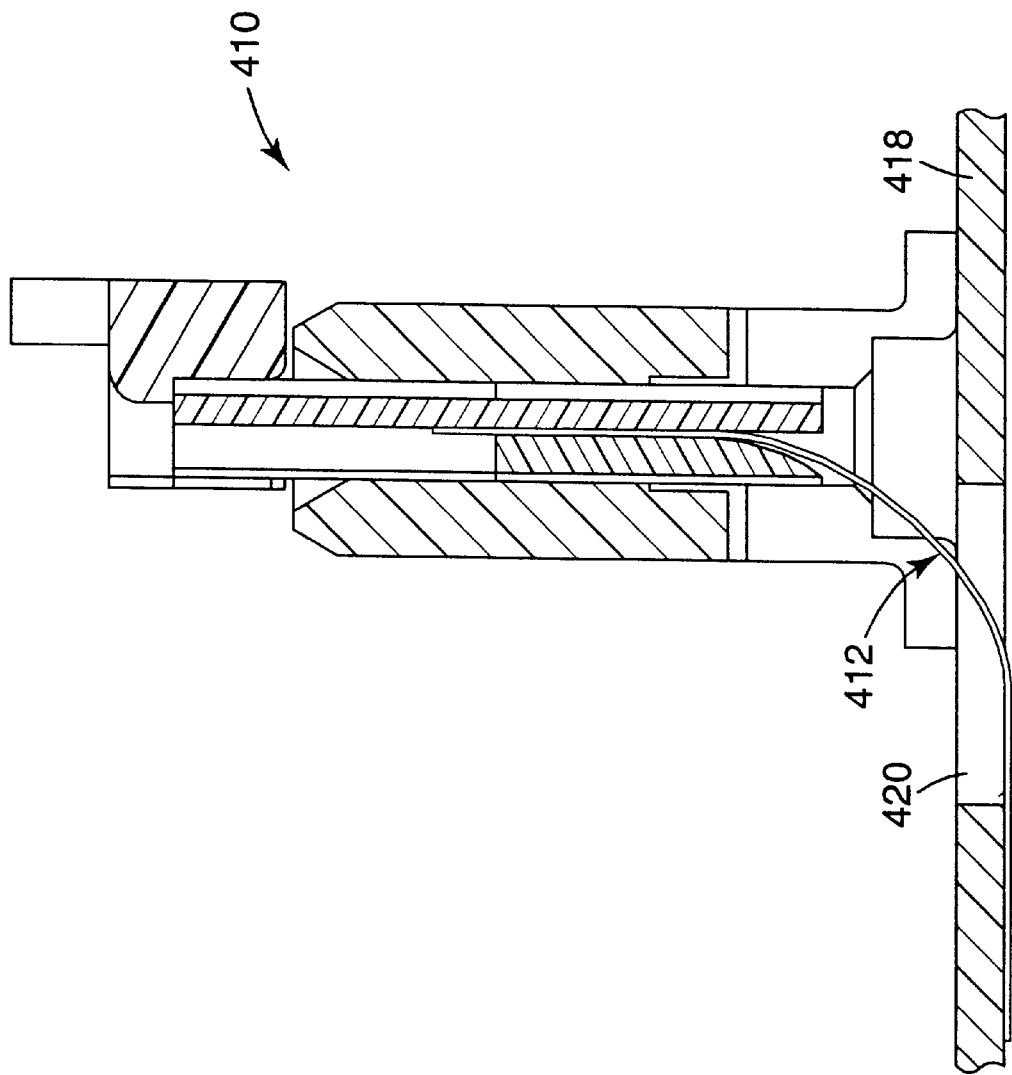
FIG. 12 is a side elevation view of a sixth embodiment of a connector assembly in accordance with the present invention.

FIG. 12 illustrates yet another embodiment of a connector system 410 in accordance with the present invention. The connector system 410 is similar to the connector system 10 of FIGS. 1–3. One noticeable difference is that in the connector system 410, the motherboard 418 defines an aperture 420 that allows the fiber bus 412 to connect to the opposite surface of the motherboard 418. While the thickness of the board 418 may be taken into account when calculating the height h for the connector system 410, it is important to note that the system does not depend on the thickness of the board 418 to provide bend radius control.

The design of the connector systems of the present invention offers significant advantages. The use of freely arching fibers does not require the fibers to be inside the backplane, therefore not requiring backplanes of unconventional thickness. The bend radius control in the present design is provided by the connector system, not the thickness of the backplane. The design provides the capability to add an optical backplane to any existing electrical backplane and does not require a special backplane construction. The optical backplane circuit is simply laminated as an additional layer to the customer provided electrical backplane, as discussed in commonly owned U.S. Pat. No. 5,902,435, which is hereby incorporated by reference.

Another advantage of the present system is that the optical fiber bus maintains all fibers aligned along the same plane, avoiding twisting about the longitudinal axis of the bus, which may cause uneven stresses on the individual fibers.

The present invention was illustrated using substrates meeting at perpendicular angles. Those skilled in the art will readily appreciate that the present invention may be applied to connectorizing boards intersecting at acute or obtuse angles.

Those skilled in the art will appreciate that the present invention may be used when coupling a variety of optical devices. While the present invention has been described with a reference to exemplary preferred embodiments, the invention may be embodied in other specific forms without departing from the spirit of the invention. Accordingly, it should be understood that the embodiments described and illustrated herein are only exemplary and should not be considered as limiting the scope of the present invention. Other variations and modifications may be made in accordance with the spirit and scope of the present invention.

What is claimed is:

1. A connector assembly for optically coupling a first optical waveguide array attached to a first substrate to an optical device on an intersecting second substrate, the first waveguide array comprising a plurality of parallel optical waveguides having a minimum desired bend radius, the first and the second substrate defining a first and a second plane respectively and the longitudinal direction of the first waveguide array defining a first axis, the first waveguide array comprising a substrate portion attached to the first substrate, a midspan portion, and an end portion, wherein the first plane intersects the second plane and the intersection of the two planes defines an intersection axis that is generally perpendicular to the first axis, the connector assembly comprising:

a) a first connector attached to the second substrate and aligned along a second axis generally perpendicular to the intersection axis, the first connector comprising a first retaining mechanism that receives and retains the end portion of the first optical waveguide array;

b) wherein the end portion is suspended over the first plane at a distance along the second axis that is at least equal to the minimum desired bend radius and wherein the midspan portion of the first optical waveguide array describes a suspended bend curve between the first and the second plane, the suspended bend curve having a bend radius that is equal or greater than the desired minimum bend radius.

2. The connector assembly of claim 1, further comprising a second connector having alignment and mating features matching and coupling to the first connector, wherein the second connector is aligned along the second axis and the second plane, the second connector including a second retaining mechanism that receives and retains a second optical waveguide array.

3. The connector assembly of claim 2, wherein the first and second connectors have limited first and second ranges of movement along the second axis, the first and the second connector including biasing elements that bias the first and second connectors towards each other.

4. The connector assembly of claim 2, further comprising a shell that slides over the first and the second connector, the shell having internal geometry features that match external geometry features in the first and second connectors and that align the first and second connectors.

5. The connector assembly of claim 1, wherein the waveguide array comprises a plurality of parallel optical fibers and the first retaining mechanism comprises a fiber receiving surface that accommodates the parallel optical fibers of the first optical waveguide array and a cover that secures the parallel optical fibers against the fiber-receiving surface, wherein the cover includes a chamfered portion at the end closer to the intersection axis, the chamfered portion describing a curve having a radius at least equal to the minimum desired bend radius of the first optical waveguide array.

6. The connector assembly of claim 1, wherein the first retaining mechanism is slidably mounted to the first substrate and allows the end portion a first range of movement along the second axis, the first range of movement determining a maximum and a minimum position with respect to the first plane, wherein the minimum and maximum positions are selected such that the radius of the suspended bend curve of the midspan portion at either position is at least equal to the minimum desired bend radius for the first optical waveguide array.

7. The connector assembly of claim 6, wherein the first connector includes a first connector block and a mounting assembly, wherein the first connector block is slidably mounted onto the mounting assembly, the mounting assembly including at least one biasing element that biases the first connector block towards a first direction along the first range of movement and at least one detent member that limits the range of motion of the first connector block.

8. The connector assembly of claim 1, further comprising a second connector that retains the substrate portion of the first optical waveguide array.

9. The connector assembly of claim 8, wherein the third connector allows a third range of motion for the substrate portion along the first axis, the third range of motion having a maximum and a minimum value such that the bend radius of the suspended portion is at least equal to the minimum desired bend radius.

10. The connector assembly of claim 1, wherein the first substrate comprises a motherboard and the second substrate comprises a daughter card generally perpendicular to the motherboard.

11. The connector assembly of claim 1, wherein the first substrate comprises a backplane and the second substrate comprises a printed circuit card generally perpendicular to the backplane.

12. The connector assembly of claim 1 further comprising a second waveguide array, wherein the first and second waveguide arrays are optical buses optically coupled to optical devices.

13. The connector assembly of claim 2, wherein the first and second connectors are a connector pair, the connector assembly including a plurality of connector pairs.

14. The connector assembly of claim 1, further comprising a receptacle having an optical device, wherein the receptacle optically connects to the first connector.

15. The connector assembly of claim 8, further comprising a receptacle having an optical device, wherein the receptacle optically connects to the third connector.

16. A connector assembly for coupling optical devices disposed on a first and a second plane, wherein the first and second planes intersect at an intersection axis z, the connector assembly comprising:

a) an optical waveguide array including a plurality of waveguides, the waveguides having a minimum desired bend radius;

b) a first waveguide retaining means for securing a first end portion of the optical waveguide array to the first plane;

c) a second waveguide retaining means for securing a second end portion of the optical waveguide array to the second plane;

d) wherein the first and second waveguide retaining means secure the first and second end portions of the waveguide array at minimum predetermined first and second distances from the intersection axis z, and the waveguide array arches between the first and the second plane having a bend radius equal to or greater than the minimum desired bend radius.

17. The connector assembly of claim 16, the first waveguide retaining means further comprising first connector means for coupling the waveguide array to an optical device.

18. The connector assembly of claim 17, wherein the second waveguide retaining means includes second connector means for coupling the waveguide array to a second optical device.

19. The connector assembly of claim 16, wherein the first waveguide retaining means includes range of motion means for allowing the first end portion of the waveguide array a range of motion along the longitudinal axis of the first end portion.

20. The connector assembly of claim 19, wherein the second waveguide retaining means includes range of motion means for allowing the second end portion of the waveguide array a range of motion along the longitudinal axis of the second end portion.

21. The connector assembly of claim 19, wherein the range of motion means includes biasing means for biasing the retaining means to a desired position.

22. The connector assembly of claim 16, further comprising a connector element having an optical device connecting to the first waveguide retaining means.

23. The connector assembly of claim 22, wherein the connector element comprises a ferrule and the optical device comprises a second waveguide array.

* * * * *